United States Patent
Gui et al.

(10) Patent No.: US 11,554,878 B2
(45) Date of Patent: Jan. 17, 2023

(54) UNDERCARRIAGE PROVIDED WITH A LIGHTNING PROTECTION DEVICE

(71) Applicant: SAFRAN LANDING SYSTEMS, Velizy Villacoublay (FR)

(72) Inventors: Jérôme Gui, Issy les Moulineaux (FR); Alexandre Avenet, Toulouse (FR); Pierre Pizana, Moissy-Cramayel (FR); Yvain Serignac, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 784 days.

(21) Appl. No.: 16/394,435

(22) Filed: Apr. 25, 2019

(65) Prior Publication Data
US 2019/0329902 A1  Oct. 31, 2019

(30) Foreign Application Priority Data

Apr. 26, 2018 (FR) ..................................... 18 53668

(51) Int. Cl.
*B64D 45/02* (2006.01)
(52) U.S. Cl.
CPC .................... *B64D 45/02* (2013.01)
(58) Field of Classification Search
CPC ........ B64D 45/02; B64C 25/405; B64C 25/02
See application file for complete search history.

(56) References Cited

U.S. PATENT DOCUMENTS

| 2,320,547 | A  | * | 6/1943 | Tiger ...................... B64C 25/40 |
| | | | | 244/103 S |
| 6,435,452 | B1 | * | 8/2002 | Jones ..................... B64C 1/1453 |
| | | | | 244/129.1 |
| 2008/0142634 | A1 | | 6/2008 | Moe et al. |
| 2014/0148038 | A1 | * | 5/2014 | Cahill .................... G01D 11/30 |
| | | | | 439/350 |
| 2017/0361923 | A1 | | 12/2017 | Himmelmann et al. |

FOREIGN PATENT DOCUMENTS

| EP | 2 735 850 A2 | 5/2014 |
| EP | 3 269 524 A2 | 6/2017 |
| WO | 2005/096721 A2 | 10/2005 |

OTHER PUBLICATIONS

French Preliminary Search Report dated Sep. 13, 2018.

* cited by examiner

*Primary Examiner* — Richard Green
*Assistant Examiner* — Steven J Shur
(74) *Attorney, Agent, or Firm* — Sughrue Mion, PLLC

(57) ABSTRACT

An aircraft undercarriage including electrical equipment (2, 3) fastened to a portion (1) of the undercarriage and a lightning protection device (10) comprising at least one shield fastened to said portion (1) of the undercarriage by fastener means so as to extend in register with the electrical equipment (2, 3) in a position that is spaced apart therefrom, the shield comprising at least a first plate (11) made of electrically conductive material that is arranged to absorb a major portion of the heat energy that is generated by the passage of a lightning wave and to discharge the electric charge of the lightning wave.
An aircraft fitted with such an undercarriage.

14 Claims, 2 Drawing Sheets

UNDERCARRIAGE PROVIDED WITH A LIGHTNING PROTECTION DEVICE

The present invention relates to the field of aviation, and more particularly to aircraft landing gear.

STATE OF THE ART

Since the risk of an aircraft being struck by lightning is quite high, aircraft include various means for limiting the consequences of a lightning strike. The structural elements of the aircraft are thus connected to the ground of the aircraft, and equipment that might be struck by lightning is protected by lightning rods. The equipment that is installed at present on landing gear is not threatened, so no protection is provided against lightning.

However, for several years there has been a desire to reduce the consumption of fuel and the pollution produced by airplane engines. To achieve this object, alternative solutions have been devised and developed for enabling airplanes to move on the ground without assistance from their main engines, which consume large quantities of kerosene. One concept relies on fastening an electric gear motor on the leg of at least one of the undercarriages so as to enable the airplane to move on the ground in autonomous manner without having recourse to its main engines.

It is found that such gear motors include portions that are far enough away from the leg of the undercarriage to present a point effect such that said portions constitute preferred zones for being struck by lightning. Such a lightning strike could lead to the gear motor being destroyed and to high currents and high voltages being conveyed to the electrical and/or electronic equipment to which the gear motor is connected. Furthermore, a risk of fire in the fuselage is not to be excluded.

Proposals have been made to shield the entire electrical harness of the undercarriage so as to withstand a lightning wave. Nevertheless, even if the shielding withstands a lightning wave, the currents induced by the lightning wave in the conductors of the electrical hardness would still be too great for electronic control circuits and in particular for computers.

Proposals have also been made to place a lightning rod on the undercarriage, however the space constraints that apply to this part of an aircraft, in particular when the undercarriage is retracted into its wheel well, make installing such a lightning rod very complicated.

OBJECT OF THE INVENTION

An object of the invention is to provide means for limiting the risk of a lightning strike durably degrading the operation of an aircraft.

BRIEF SUMMARY OF THE INVENTION

To this end, the invention provides an aircraft undercarriage including electrical equipment fastened to a portion of the undercarriage and a lightning protection device comprising at least one shield fastened to said portion of the undercarriage by fastener means so as to extend in register with the electrical equipment in a position that is spaced apart therefrom. The shield comprises at least a first plate made of electrically conductive material that is arranged to absorb a major portion of the heat energy that is generated by the passage of a lightning wave and to discharge the electric charge of the lightning wave.

The first plate is thus for forming the point of entry or exit for the lightning wave and for passing as easily as possible the corresponding current. Since the first stage of the lightning wave is very powerful and has frequencies that are very high, the currents do not enter into the first plate and they flow essentially at the surface of the first plate. The second stage of the lightning wave is of very high energy, and current enters into the plate and the thermal stress is absorbed by the first plate. The first plate is preferably made of a material that melts at the temperature generated by passing the lightning wave, so the plate melts, at least in part. The distance left between the first plate and the electrical equipment serves to limit any risk of the electrical equipment being heated up excessively.

Preferably, the lightning protection device further comprises a second plate made of electrically conductive material extending parallel to the first plate between the first plate and the electrical equipment in a position that is spaced apart from the electrical equipment and from the first plate. Advantageously, the first plate is fastened on the second plate, which forms a portion of the means for fastening the first plate to said portion of the undercarriage, the second plate being connected to the electrical equipment.

The second plate supports the first plate, provides continuity for currents flowing to the structure of the undercarriage, and constitutes second thermal insulation. If the first plate is made of metal, the second plate blocks any molten metal spray coming from the first plate. The electrical equipment is thus protected from high currents, from molten metal spray, and from the localized rise in temperature at the point of entry or exit of the lightning wave.

The invention also provides an aircraft fitted with such an undercarriage.

Other characteristics and advantages of the invention appear on reading the following description of particular, non-limiting embodiments of the invention.

BRIEF DESCRIPTION OF THE FIGURES

Reference is made to the accompanying drawings, in which.

DETAILED DESCRIPTION OF THE INVENTION

Figure 1:
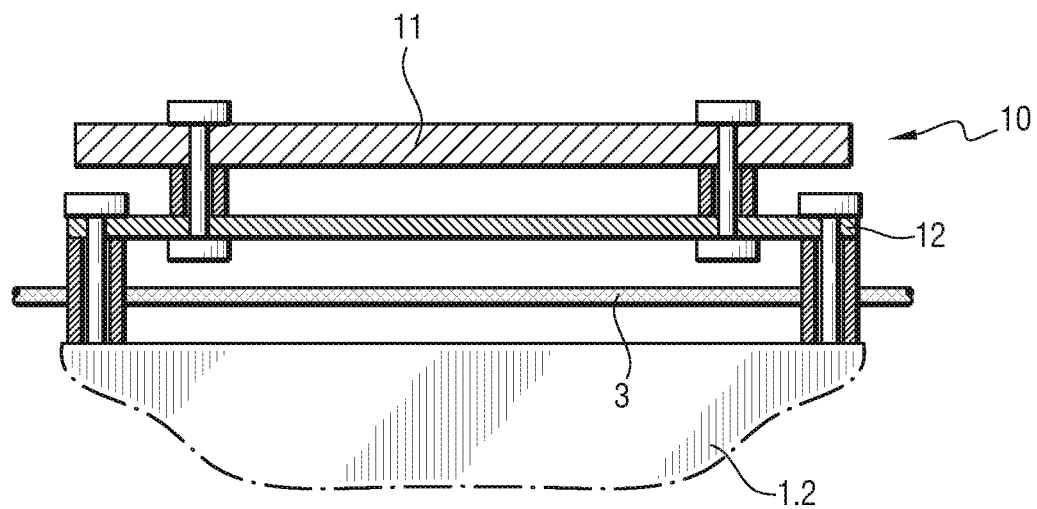
FIG. 1 is a diagrammatic cross-section view of a lightning protection device of the invention.
Figure 2:
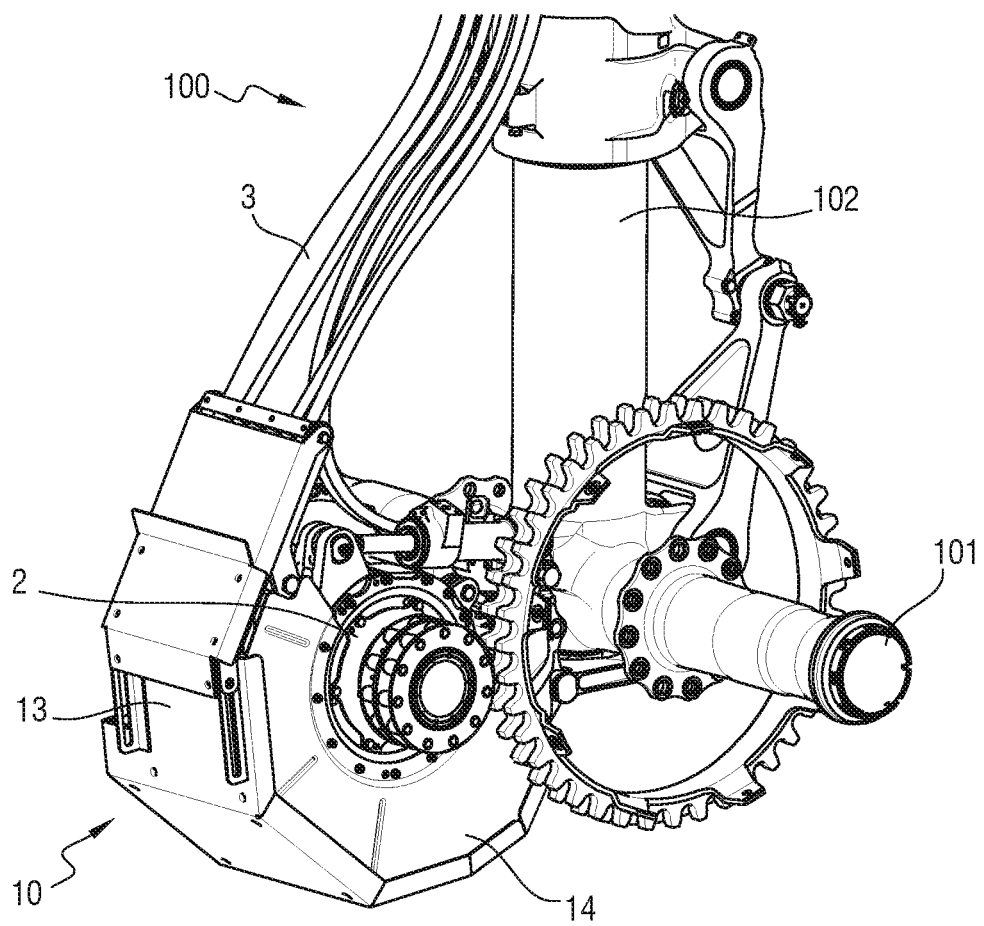
FIG. 2 is a diagrammatic perspective view of an undercarriage of the invention.
Figure 3:
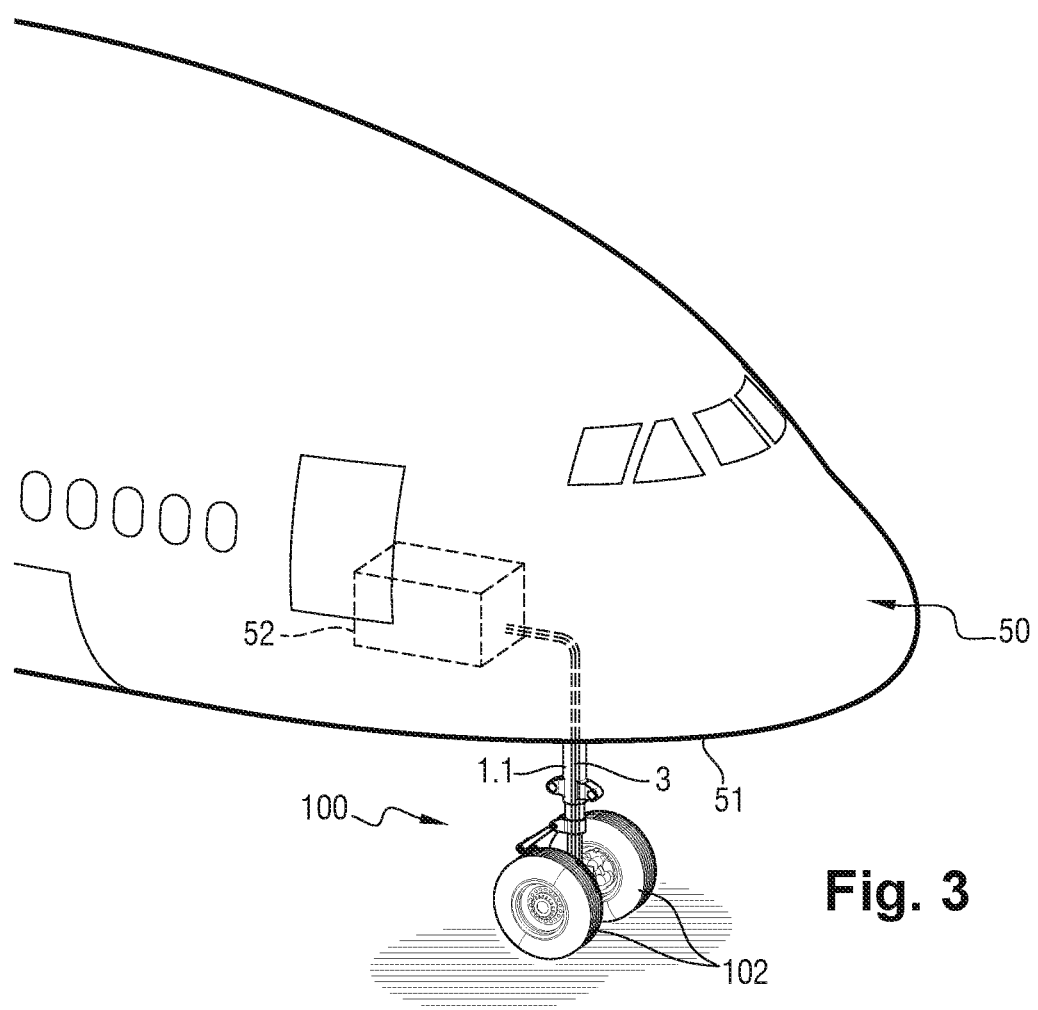
FIG. 3 is a diagrammatic view of an aircraft fitted with such an undercarriage.

With reference to the figures, the invention is described in application to an aircraft 50 having a fuselage 51 including an electronic control unit 52 of the aircraft 50. The fuselage 51 has a nose provided with an undercarriage given overall reference 100.

The undercarriage 100 comprises a leg 1 having one end 1.1 hinged to the fuselage 51 and a free end 1.2 that is provided with two axles 101 for receiving respective wheels 102. The free end 1.2 is also provided with an electric gear motor 2 for driving the wheels 102 in rotation and connected by a harness 3 of electric cables to a power supply (not shown) and to the control unit 52. The gear motor 2 is arranged to mesh with a toothed wheel constrained to rotate with one of the wheels 102 so that controlling the gear motor 2 enables the wheel 102 to be driven in rotation while taxiing. The harness 3 extends in a cable path that runs along the leg 1 of the undercarriage 100. The undercarriage 100 is itself known and is not described in greater detail herein. In particular, there are shown neither the means for deploying and retracting the undercarriage 100, nor the means serving to engage the gear motor with the toothed wheel, and to disengage it therefrom.

The undercarriage 100 includes a lightning protection device, given overall reference 10, that comprises a plurality of shields fastened to the free end 1.2 of the leg 1 of the undercarriage by fastener means in such a manner that the shields extend in register with the gear motor 2 and the bottom segment of the harness 3. Each shield extends in a position that is spaced apart from the gear motor 2 or the bottom segment of the harness 3 in resister with which it is positioned.

Each shield comprises a first plate 11 and a second plate 12.

The first plate 11 is made of electrically conductive material and it is arranged to absorb the major portion of the heat energy that is generated by the passage of a lightning wave and to discharge the electric charge of the lightning wave. The first plate 11 is made of metal and its thickness lies in the range 2 millimeters (mm) to 4 mm, approximately. The metal of the first plate 11 in this example is an aluminum alloy.

The second plate 12 is made of electrically conductive material. The second plate 12 is made of metal and its thickness lies in the range 1 mm to 2 mm approximately. In this example, the metal of the second plate 12 is an aluminum alloy or a steel.

In FIG. 1, it can be seen that the first plate 11 is fastened by columns on the second plate 12, which forms a portion of the fastener means for fastening the first plate 11 to the free end 1.2 of the leg 1 of the undercarriage. Each of these columns is formed by a bolt made of steel or aluminum extending in a tubular spacer that is clamped between the two plates in order to hold the two plates spaced apart from each other. The second plate 12 extends parallel to the first plate 11 between the first plate 11 and the gear motor 2 and the first plate 11 and the harness 3 in a position that is spaced apart from the gear motor 2 and from the harness 3 and from the first plate 11. The first plate 11 is spaced apart from the second plate 12 by a distance lying in the range 3 mm to 5 mm approximately.

The shield fastener means extending in register with the harness 3 connect the second plate 12 to the cable path by means of columns. Each of these columns is formed by a bolt made of steel or of aluminum extending in a tubular spacer that holds the second plate and the cable path spaced apart.

In this example, the shield fastener means extending in register with the gear motor 2 also include two side walls 13 and 14 made of electrically conductive material that connect the second plate 12 to the free end 1.2 and that extend on either side of the gear motor 2, at a distance therefrom.

Naturally, the invention is not limited to the embodiment described, but covers any variant coming within the ambit of the invention as defined by the claims.

In particular, the shield could comprise only one plate, namely the first plate. The first plate would then be thicker in order to be able to absorb the heat energy that is generated by the passage of a lightning wave. This is particularly important when the first plate is made of metal: it is important to avoid the first plate being pierced and molten metal being sprayed onto the electrical equipment.

The electrical equipment may be any element that conducts electricity, an electrical harness, an electromagnetic or electromechanical actuator, a power circuit, or a control circuit, . . . .

The side walls 13 and 14 may be provided with slots to allow air to flow in order to cool the electrical equipment.

The shield may be installed on any type of undercarriage, and for example on a two-wheel undercarriage or on an undercarriage having a bogey with four wheels or with six wheels.

The actuator and the connection to the wheel of the taxiing device may be made differently.

The first plate is fastened to the second plate, which forms a portion of the means for fastening the first plate to said portion of the undercarriage. Fastening may be performed using elements that are screwed, bolted, riveted, etc.

The invention claimed is:

1. An aircraft undercarriage including electrical equipment fastened to a portion of the undercarriage and a lightning protection device comprising at least one shield fastened to said portion of the undercarriage by fastener means so as to extend in register with the electrical equipment in a position that is spaced apart therefrom, the shield comprising at least a first plate made of electrically conductive material that is arranged to absorb a major portion of the heat energy that is generated by the passage of a lightning wave and to discharge the electric charge of the lightning wave, wherein the lighting protection device further comprises a second plate made of electrically conductive material extending parallel to the first plate between the first plate and the electric equipment in a position that is spaced apart from the electrical equipment and from the first plate, the first plate being fastened on the second plate, which forms a portion of the means for fastening the first plate to said portion of the undercarriage, the second plate being connected to the electrical equipment.

2. The undercarriage according to claim 1, wherein the first plate is spaced apart from the second plate by a distance in the range of about 3 mm to about 10 mm.

3. The undercarriage according to claim 2, wherein the first plate is spaced apart from the second plate by a distance in the range of about 3 mm to about 5 mm.

4. The undercarriage according to claim 1, wherein the first plate is made of metal and has a thickness in the range 2 mm to 4 mm approximately.

5. The undercarriage according to claim 4, wherein the metal of the first plate is an aluminum alloy.

6. The undercarriage according to claim 1, wherein the second plate is made of metal and has a thickness in the range of about 1 mm to about 4 mm.

7. The undercarriage according to claim 6, wherein the thickness is in the range of about 1 mm to about 2 mm.

8. The undercarriage according to claim 6, wherein the metal of the second plate is an aluminum alloy.

9. The undercarriage according to claim 6, wherein the metal of the second plate is a steel.

10. The undercarriage according to claim 1, wherein the electrical equipment is an electrical harness.

11. The undercarriage according to claim 1, wherein the electrical equipment is an electromagnetic actuator.

12. The undercarriage according to claim 11, wherein the electrical equipment is a gear motor.

13. The undercarriage according to claim 1, wherein the fastener means include two side walls made of electrically conductive material that extend on either side of the electrical equipment at a distance therefrom and that are connected to the second plate.

14. An aircraft including a fuselage containing a cockpit provided with an electronic control unit, the fuselage being provided with at least one undercarriage according to claim 1, the electrical equipment of the undercarriage being connected to the electronic control unit.

\* \* \* \* \*